United States Patent
Golchehreh et al.

(10) Patent No.: US 11,137,989 B1
(45) Date of Patent: Oct. 5, 2021

(54) CONSTRUCTING A DATA FLOW GRAPH FOR A COMPUTING SYSTEM OF AN ORGANIZATION

(71) Applicant: Relyance, Inc., Mountain View, CA (US)

(72) Inventors: Leila Rose Golchehreh, San Ramon, CA (US); Abhishek Sharma, Mountain View, CA (US)

(73) Assignee: Relyance, Inc., Mountain View, CA (US)

( * ) Notice: Subject to any disclaimer, the term of this patent is extended or adjusted under 35 U.S.C. 154(b) by 0 days.

(21) Appl. No.: 17/204,456

(22) Filed: Mar. 17, 2021

(51) Int. Cl.
*G06F 9/44* (2018.01)
*G06F 8/41* (2018.01)
*G06F 8/73* (2018.01)
*G06F 8/75* (2018.01)

(52) U.S. Cl.
CPC ........... *G06F 8/433* (2013.01); *G06F 8/73* (2013.01); *G06F 8/75* (2013.01)

(58) Field of Classification Search
None
See application file for complete search history.

(56) References Cited

U.S. PATENT DOCUMENTS

| | | | |
|---|---|---|---|
| 6,538,651 B1 * | 3/2003 | Hayman | G06T 17/00 345/419 |
| 10,394,805 B2 * | 8/2019 | Warner | G06F 16/27 |
| 2004/0024887 A1 * | 2/2004 | Grabauskas | H04L 69/329 709/229 |
| 2018/0211153 A1 * | 7/2018 | Hunt | G06N 3/0445 |
| 2019/0332667 A1 * | 10/2019 | Williams | G06F 16/3329 |
| 2020/0234101 A1 * | 7/2020 | Hanselmann | G06N 3/08 |

* cited by examiner

*Primary Examiner* — Anna C Deng
(74) *Attorney, Agent, or Firm* — Medley, Behrens & Lewis, LLC

(57) ABSTRACT

Technologies related to constructing a data flow graph are described herein, where the data flow graph indicates that personal data is passed from a first computer-executable module of an organization computing system to a second computer-executable module of the organization computing system. The data flow graph is constructed based upon static analysis data pertaining to source code of the organization computing system; the data flow graph is further constructed based upon infrastructure data that provides runtime information for the organization computing system.

20 Claims, 8 Drawing Sheets

| SYSTEM | STATUS | CONTACT | CATEGORIES | TYPES | REASON |
|---|---|---|---|---|---|
| THIRD PARTY ID | ACTIVE | EMAIL/ TELEPHONE | ADVISORS, AGENTS, PARTNERS, CONSULTANTS, EMPLOYEES, END USERS, PROSPECTS, VENDORS | COMMUNICATIONS DATA, CONTRACT DETAILS, CUSTOMER ACCOUNT AND USAGE DETAILS, EMAIL ADDRESSES, EMPLOYER JOB POSITIONS, LOCALISATION DATA, NAME, ORDER ID/ HISTORY, PERSONAL LIFE DATA, PHONE NUMBER, PROFESSIONAL LIFE DATA | ORGANIZATION DOCUMENT MANAGEMENT |

FIG. 6

CONSTRUCTING A DATA FLOW GRAPH FOR A COMPUTING SYSTEM OF AN ORGANIZATION

BACKGROUND

Organizations are building increasingly complex computer-implemented systems. In an example, computing systems may include proprietary code generated by developers of an organization, oftentimes in multiple different programming languages, where such code, when compiled and executed, corresponds to computer-executable modules that consume data from and/or pass data to other computer-executable modules (where, for example, a computer-executable module may be a microservice, a portion of monolithic code, etc.). In addition, one or more of the computer-executable modules may consume data from and/or pass data to computing systems of third parties. The computing systems of the third parties may then process data received from the computer-executable modules referenced above in a manner that is not transparent to the organization.

As a consequence of the complexities of modern organization computing systems, and further as a consequence of these computing systems being subjected to frequent change, understanding what types of data are being passed to and consumed by computer-executable modules and third-party computing systems, and also understanding how certain type(s) of data flow between computer-executable modules and third-party computing systems, is incredibly challenging. In an example, a data privacy officer of an organization is tasked with ensuring that the organization, when processing personal data (data related to a person, persons, household, etc., including de-identified data that relates to a person, persons, household, etc.), does not violate data privacy policies, statutes, and/or regulations. Thus, the data privacy officer must not only be up to date on current policies, statutes, and regulations related to data privacy, but the data privacy officer must also be aware of how personal data is processed in the computing system of the organization. Conventionally, to acquire an understanding about how the computing system of the organization processes personal data, surveys and/or forms are provided to specific team members, for example, software architects and developers, where the team members respond to such surveys with information as to how, for portions of the computing system of the organization about which the architects and developers have knowledge, the team members believe that personal data is processed. It can be ascertained that this approach is problematic, as responsibilities of team members such as architects and developers may change, team members may change employment, team members may not be able to precisely recollect what functions consume and pass personal data, etc. Moreover, the computing system may be updated shortly after information from the survey and/or forms is obtained, rendering the information provided immediately obsolete. Therefore, the data privacy officer is often provided with obsolete and/or incorrect information as to how personal data is processed by the organization computing system.

Computer-implemented technologies have been developed to assist an organization with data protection and compliance and identifying possible violations of data privacy policies, regulations, and statutes. These technologies require their users to manually enter information (which is often obsolete, as explained above), provide limited visibility into computer-implemented systems, and/or require access to databases of the organization, where the databases are scanned to identify entries stored in the databases that include personal data. These technologies, however, are inherently problematic, as they require the organization to rely on inaccurate information or grant full access to databases of the organization to another computing system, which in and of itself is a data protection risk. Moreover, these technologies provide no indication as to how data flows through the computing system of the organization and are also not robust as to alterations that may occur in the computing system. Rather, the technologies mentioned above provide an indication that, at a particular point in time, a particular database may include personal data (such as a name of a person, contact information of the person, IP address, etc.). Thus, current technologies are unable to capture the continuously evolving, morphing, changing nature of data processing activities of an organization.

SUMMARY

The following is a brief summary of subject matter that is described in greater detail herein. This summary is not intended to be limiting as to the scope of the claims.

Described herein are various technologies pertaining to identifying and continuously monitoring data flows throughout an organization computing system, where the organization computing system may include proprietary code for an organization, open-source code, etc. that, when compiled and executed, corresponds to computer-executable modules, such as microservices. The code includes functions that are configured to consume data from and/or pass data to other functions. Therefore, at runtime, the computer-executable modules may consume data from and/or pass data to other computer-executable modules and/or third-party computing systems. Likewise, the third-party computing systems may consume data from and/or pass data to one or more computer-executable modules of the organization computing system. In addition, the technologies described herein are configured to analyze computer-readable documents of the organization to identify constraints in the documents with respect to data of a predefined type. A constraint may be set forth as an internal policy in a document, a contractual constraint, a statutory or regulatory constraint, etc. Based upon recognized flows of data of the predefined type through the computing system, and further based upon an identified constraint, the technologies described herein are configured to generate an output that indicates to an analyst (e.g., a Data Privacy Officer, Engineer, Data Scientist, Attorney, Chief Security Officer, etc.) of the organization computing system that the constraint may be violated.

With more specificity, a computing system described herein obtains the following information with respect to an organization computing system that is subject to analysis: 1) code analysis data, where the code analysis data comprises names of functions and parameters passed by such functions when the code is executed by the organization computing system; 2) infrastructure analysis data, where the infrastructure analysis data is indicative of runtime information about the organization computing system, including identities of computer-executable modules executed by the organization computing system; and 3) third-party analysis data, where the third-party analysis data comprises identities of third-party computing systems that consume data from and/or pass data to the organization computing system, and further where the third-party analysis data is indicative of types of data that are consumed by third-party computing systems. Based upon the code analysis data, infrastructure analysis data, and third-party analysis data, a data flow graph is constructed, where the data flow graph identifies flows of data of predefined type(s) amongst and between the computer-executable modules and third-party computing systems referenced above. In a non-limiting example, the data flow graph identifies flows of personal data (e.g., names, telephone numbers, account numbers, IP addresses, addresses, gender, etc.) amongst and between the computer-executable modules and third-party computing systems, and is configured to be informative to an analyst of the organization computing system as to potential compliance, privacy, security, contractual, and data protection risks, as well as potential and actual violations of data privacy policies, contracts, compliance requirements, statutes, and/or regulations.

In addition, the computing system can be configured to obtain document analysis data, where the document analysis data is indicative of information specified in computer-readable documents of the organization with respect to data of a predefined type (e.g., personal data and/or a particular type of personal data), including one or more constraints relevant to the data of the predefined type. For example, a computer-readable document of the organization may be a Master Service Agreement (MSA) or Data Processing Agreement (DPA) between the organization and a customer thereof, where the MSA or DPA include information and with respect to processing and/or transmittal of a predefined type of data. The computing system is configured to employ natural language processing (NLP) technologies to identify information (e.g., information required to generate a record of data processing activity, constraints as to certain types of information, etc.). Based upon the data flow graph and information from the document(s), the computing system can output an indication or insight to the analyst of the organization computing system that, for example, a constraint specified in the computer-readable document is met or violated. In another example, based upon the data flow graph and information from the document(s), compliance risks for the organization can be identified. The computing system can further output an indication as to where in the computing system (e.g., which computer-executable module and/or third-party computing system) the requirements are met or the constraint is violated. Technologies related to generating the (i) code analysis data, (ii) infrastructure analysis data, (iii) third-party analysis data, and (iv) document analysis data are additionally described herein.

The technologies described herein exhibit various advantages over conventional approaches for analyzing data of predefined types in organization computing systems. For example, the computing system constructs the data flow graph based upon the code analysis data, the infrastructure analysis data, the third-party analysis data, and optionally the document analysis data without scanning data stored in databases of the organization computing system. Moreover, the computing system is configured to continuously monitor, manage, and update the data flow graph, such that when the organization computing system is updated (e.g., code of the organization computing system is updated), the computing system updates the data flow graph (and analyzes the data flow graph with respect to constraints specified in computer-readable documents and/or appropriate regulations) and produces a global data inventory and data map.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 6 depicts a record that can be automatically constructed based upon a data flow graph of an organization computing system.

DETAILED DESCRIPTION

Figure 1:
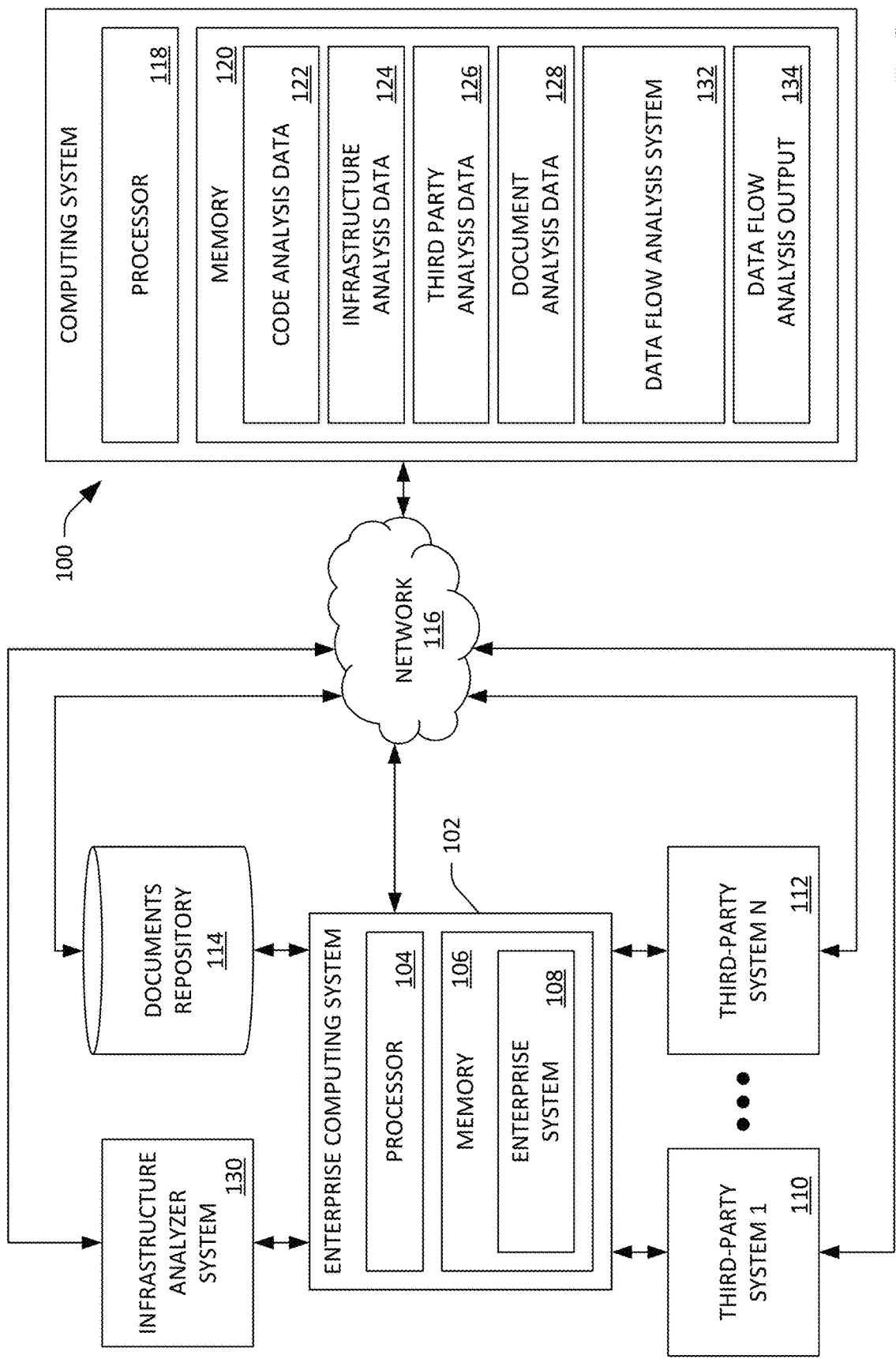
FIG. 1 is a functional block diagram that depicts a computing system that is configured to construct a data flow graph for an organization computing system.

Various technologies pertaining to constructing a data flow graph of an organization computing system to represent a "live" and agile view of flow of data of a predefined type through the organization computing system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The technologies described herein are particularly well-suited for use in connection with organization computing systems that process personal data, where the term "personal data" refers to data that relates to a person, persons, and/or household, including de-identified and pseudo-anonymous data. Thus, the term "personal data" encompasses a name, an electronic account identifier, financial data, contact information, home addresses, employment information, IP address, either in the clear or de-identified/anonymized, amongst other data. Utilizing the technologies described herein, an organization is given insight into which computer-executable modules (such as microservices) of an organization computing system consume and pass personal data, and is further given insight into which third-party computing systems are in communication with one or more of the computer-executable modules (and which third-party computing systems receive personal data from computer-executable modules of the organization computing system). Further, the technologies described herein are configured to output indications to an analyst of the organization computing system (such as a data privacy officer) that the organization may be either upholding or violating one or more data privacy statutes or regulations due to a manner in which the organization computing system handles personal data. The technologies described herein are advantageous over conventional technologies for analyzing organization computing systems for statutory and regulatory violations, in that the technologies described herein are configured to provide an up-to-date ("live" or agile) view of the flow of data of a predefined type (e.g., personal data) through an organization computing system, where the organization computing system includes computer-executable modules that consume data from and/or pass data to other computer-executable modules and/or third-party computing systems. In addition, the technologies described herein provide such information without requiring access to data included in databases of the organization computing system.

While reference is made to the technologies described herein as being well-suited with respect to personal data, it is to be understood that the technologies described herein are not so limited, as such technologies can be employed to track flows of data of any suitable type across an organization computing system.

With reference now to FIG. 1, a functional block diagram of a computing system 100 that is configured to construct a data flow graph for an organization computing system 102 is illustrated. The organization computing system 102 includes at least one processor 104 and memory 106, where the memory 106 includes an organization system 108 that is subject to analysis. While the organization computing system 102, the at least one processor 104, the memory 106, and the organization system 108 are illustrated as individual functional blocks, it is to be understood that the organization computing system 102 may be a relatively complex computing system that includes several different computing devices located in different public or private data centers, where the data centers may be geographically dispersed. As will be described in greater detail herein, the organization system 108 may include proprietary code written in different programming languages that correspond to numerous computer-executable modules, where a function in the code is configured to pass data to and/or consume data from another function in the code. Therefore, a computer-executable module in the computer-executable modules passes data to and/or consumes data from another computer-executable module in the computer-executable modules.

The organization computing system 102 is in network communication with a plurality of third-party systems 110-112, where the third-party systems 110-112 operate outside of the control of the organization that manages the organization computing system 102. In a non-limiting example, the first third-party system 110 may be a telecommunications system, and the nth third-party system 112 may be a customer relationship management (CRM) system. In an example, the first third-party system 110 consumes data output by a first computer-executable module of the organization system 108 and passes data to a second computer-executable module of the organization system 108. In summary, then, when executed by the processor 104, computer-executable modules (such as microservices) of the organization system 108 can pass data to and/or consume data from other computer-executable modules of the organization system 108 and/or third-party systems, and third-party systems can pass data to and/or consume data from computer-executable modules of the organization system 108 and/or other third-party systems.

The organization computing system 102 is depicted in FIG. 1 as being in communication with a documents repository 114, where the documents repository 114 stores computer-readable documents of the organization. While the documents repository 114 is illustrated as being separate from the organization computing system 102, in another example, the documents repository 114 is included in the organization computing system 102. The computer-readable documents stored in the document repository 114 may include contracts between the organization and other organizations, contracts between the organization and individual customers, internal policies of the organization, compliance related documentation such as compliance summaries, questionnaires, and audit reports, computer-readable marketing material for the organization, etc. The computer-readable documents may include information relating to the organization, where the information can include constraints on the organization system 108 with respect to processing data of a predefined type (e.g., personal data) as well as other information related to the data of the predefined type. In an example, a computer-readable document in the documents repository 114 may include a constraint that specifies that the organization system 108 is prohibited from passing data that can be used to identify a person to a third-party system. In another example, the documents repository 114 may include publicly available marketing material that includes a constraint on the organization system 108 in regard to storing financial information (e.g., the marketing material notes that the organization system 108 does not retain financial information of customers of the organization).

The computing system 100 is in communication with the organization computing system 102 by way of a network 116 (e.g., the Internet). In addition, the computing system 100 is in communication with the third-party systems 110-112 and the documents repository 114 by way of the network 116. The memory 120 of the computing system 100 includes data that is accessed by the processor 118 and instructions that are executed by the processor 118. As illustrated in FIG. 1, the memory 120 includes code analysis data 122 and infrastructure analysis data 124. The memory 120 further optionally includes third-party analysis data 126 and document analysis data 128. The code analysis data 122, the infrastructure analysis data 124, the third-party analysis data 126, and the document analysis data 128 are described in turn.

The code analysis data 122 is data that indicates that a function in the code of the organization system 108 passes data of a predefined type to another function of the code of the organization system 108 or a third-party system (e.g., at least one of the third-party systems 110-112). As noted previously, the data of the predefined type can be data that relates to a person, persons, and/or a household, such as a name, an email address, a telephone number, a home address, a work address, a gender, age, financial information, IP address, etc. These functions in the code of the organization system 108, when compiled, correspond to computer-executable modules, such as microservices.

The infrastructure analysis data 124 is data that identifies runtime information about the organization system 108. For example, the infrastructure analysis data 124 identifies executing computer-executable modules of the organization system 108, connections between different computer-executable modules of the organization system 108, endpoints of the organization system 108, etc. Further, for instance, the infrastructure analysis data 124 indicates that a first computer-executable module of the organization system 108 passes data to a second computer-executable module of the organization system 108 at runtime; however, the infrastructure analysis data 124 is silent as to type and format of the data passed from the first computer-executable module to the second computer-executable module. The infrastructure analysis data 124 can be based upon output of an infrastructure analyzer system 130 utilized by the organization computing system 102, where the infrastructure analyzer system 130 is configured to provide infrastructure information to the organization about the organization computing system 102, such as latency associated with computer-executable modules, information about crashes that occurred in the organization system 108, throughput with respect to one or more computer-executable modules, etc. As illustrated in FIG. 1, the computing system 100 is in communication with the infrastructure analyzer system 130, and the computing system 100 can generate the infrastructure analysis data 124 based upon output of the infrastructure analyzer system 130 (where the infrastructure analyzer system 130 continuously monitors operation of the organization system 108).

The third-party analysis data 126 is data that identifies, for one or more of the third-party systems 110-112, different types of data (from amongst several predefined types) passed to the one or more third-party systems 110-112 by the organization system 108. In an example, the third-party analysis data 126 indicates that the first third-party system 110 receives email addresses of people, telephone numbers of the people, and names of the people from the organization system 108.

The document analysis data 128 includes information specified in computer-readable documents of the organization with respect to data of a predefined type (e.g., personal data and/or a particular type of personal data), including one or more constraints on the organization system 108 with respect to the data of the predefined type. As will be described in greater detail below, the document analysis data 128 is based upon information included in computer-readable documents of the documents repository 114, where natural language processing (NLP) technologies are employed to identify and summarize the information included in the computer-readable-documents.

The memory 120 of the computing system 100 additionally includes a data flow analysis system 132 that is executed by the processor 118. The data flow analysis system 132 generates a data flow analysis output 134 based upon the code analysis data 122, the infrastructure analysis data 124, and optionally the third-party analysis data 126. The data flow analysis output 134 includes a data flow graph that indicates flows of data of the predefined type between computer-executable modules of the organization system 108 and third-party systems that are in communication with the organization system 108. For instance, the data flow analysis output 134 can indicate that a first computer-executable module retrieves a name of a person from a database and passes the name of the person to a second computer-executable module. The data flow analysis output 134 can additionally indicate that the second computer-executable module passes the name of the person to the first third-party system 110. In another example, the data flow analysis output 134 includes a record of processing activity that indicates that data of the predefined type has been processed by a particular computer-executable module of the organization system 108 and/or passed to a third-party system, where the record of processing activity conforms to a data privacy/data protection regulation or statute (e.g., of a specified jurisdiction).

Moreover, the data flow analysis system 132 is configured to generate an output that indicates that a constraint on the organization system 108 with respect to data of the predefined type (as specified in a computer-readable document in the documents repository 114) is possibly violated or met based upon the data flow analysis output 134 and the document analysis data 128. In a non-limiting example, the data flow analysis output 134 indicates that an email address for a person is passed from a first computer-executable module of the organization computing system 108 to the first third-party system 110. The document analysis data 128 can indicate that a computer-readable document in the documents repository 114 specifies that the organization system 108 is prohibited from transmitting email addresses of persons to any third-party system. Accordingly, the data flow analysis system 132 generates an output that indicates that the transmission of the email addresses from the first computer-executable module to the first third-party system 110 violates the constraint specified in the computer-readable document. In addition, the output can indicate where the constraint is violated and how the constraint is violated; continuing with the example set forth above, the output can indicate that the constraint is violated at the first computer-executable module, and can further indicate that the constraint is violated due to the first computer-executable module passing the email addresses to the first third-party system 110.

It is noted that the data flow analysis output 134 generated by the data flow analysis system 132 is an up to date ("live") representation of flow of data of the predefined type through the organization system 108 (and also a "live" representation of flow of data of the predefined type to the third-party systems 110-112). The representation can be characterized as "live" due to the code analysis data 122, the infrastructure analysis data 124, and the third-party analysis data 126 reflecting current operation of the organization system 108. Moreover, the data flow analysis output 134 may be further based upon the document analysis data 128, wherein the data flow analysis output 134 identifies data of type(s) referenced in one or more electronic documents and how such data flows through the organization computing system 102. In an example, the code analysis data 122, the infrastructure analysis data 124, and the third-party analysis data 126 are updated at each build of code of the organization system 108. Further, since the infrastructure analysis data 124 is generated based upon output of the infrastructure analysis system 130, which continuously monitors infrastructure of the organization system 108, the infrastructure analysis data 124 can be continuously updated. The third-party analysis data 126 is updated by, for example, querying the third-party systems 110-112 to acquire information in schemas exposed by the third-party systems 110-112. Therefore, each time that the data flow analysis system 132 generates the data flow analysis output 134, the data flow analysis system 132 is generating such output 134 based upon current operation of the organization system 108, and therefore the data flow analysis output 134, provided to an analyst of the organization computing system 102 (e.g., a data privacy officer of the organization), is a "live" view into operation of the organization system 108.

An example of operation of the computing system 100 is now set forth. An analyst such as a data privacy officer for the organization that manages the organization computing system 102 is tasked with ensuring that the organization complies with a data privacy requirement in a document such as a contract, a regulation, and/or a statute. Thus, the data of the predefined type is personal data as specified in the contract, regulation, or statute, such as name, identity number (e.g., social security number), birth date, etc. In such an example, the code analysis data 122 indicates that a first function passes data of the predefined type (e.g., an email address) to a second function. The infrastructure analysis data 124 indicates that a first computer-executable module passes data to a second computer-executable module (without specifying that it is data of the predefined type). The infrastructure analysis data 124 further indicates that the second computer-executable module passes data to the first third-party system 110. The third-party analysis data 126 indicates that the first third-party service 110 obtains email addresses of people from the second computer-executable module. Based upon such information, the data flow analysis system 132 determines that the first computer-executable module of the organization system 108, when executed by the processor 104 of the organization computing system 102, passes data of the predefined type to the second computer-executable module of the organization system 108, which then passes data of the predefined type (email addresses) to the first third-party system 110. The data flow analysis system 132 constructs the data flow analysis output 134 (e.g., data flow graph) that identifies the flow of the data of the predefined type amongst the first computer-executable module, the second computer-executable module, and the first third-party system 110, and the data flow analysis system 132 outputs graphical information to the analyst of the organization to inform the analyst of the flow of the data of the predefined type amongst the first computer-executable module, the second computer-executable module, and the first third-party system 110.

From the foregoing, it can be ascertained that the computing system 100 exhibits numerous advantages over conventional technologies for analyzing an organization computing system with respect to handling of data of a predefined type (e.g., data specified in a contract, compliance document, data privacy regulations, and/or statutes). Specifically, as noted above, the data flow analysis system 132 can generate the data flow analysis output 134 without requiring scans of databases of the organization computing system 102. In addition, the data flow analysis output 134 is a "live" representation of the flow of data of the predefined type through the organization computing system 102, which is in contrast to the conventional technologies, where output thereof may be obsolete shortly after a database is scanned.

Figure 2:
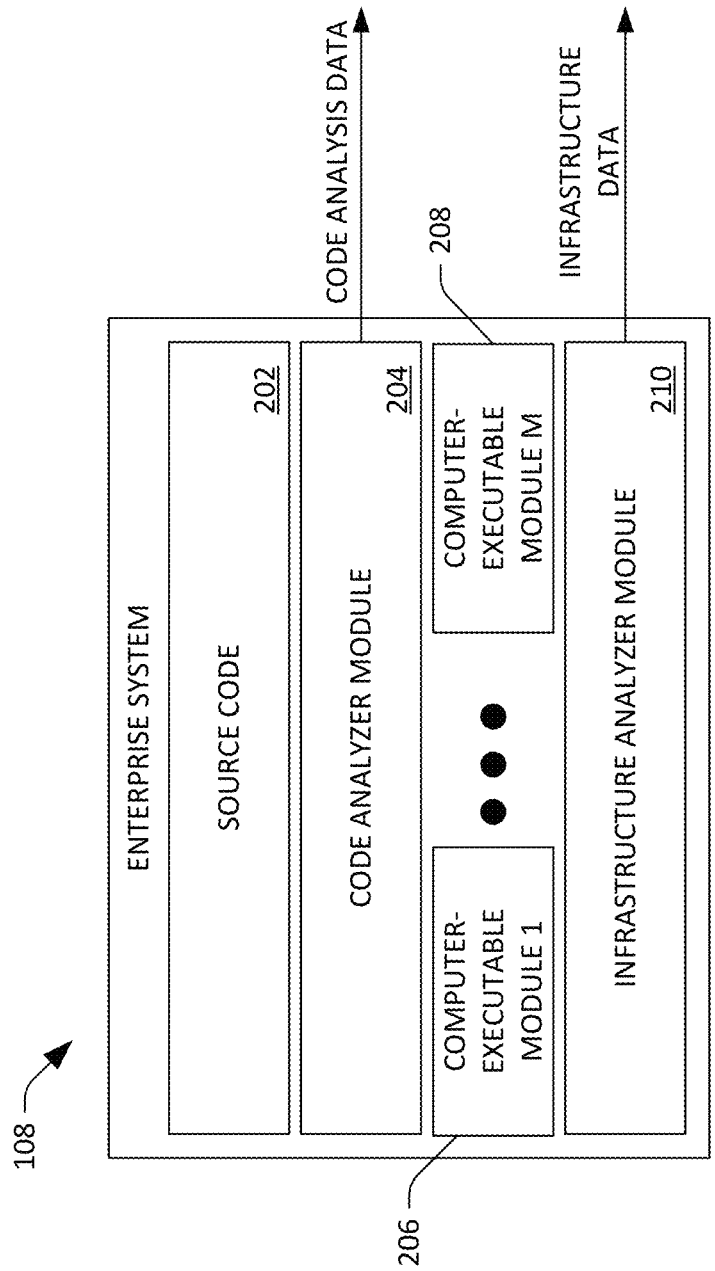
FIG. 2 is a functional block diagram of an organization system.

Now referring to FIG. 2, a functional block diagram that depicts contents of the organization system 108 is illustrated. The organization system 108 includes source code 202, where the source code 202 may include numerous files, with each file including source code, and where code in different files may be written in different languages. The organization system 108 further includes a code analyzer module 204 that is configured to perform a static analysis over the source code 202 and, based upon the static analysis, output the code analysis data 122 to the computing system 100. In an example, the code analyzer module 204 is provided to the organization system 108 by the computing system 100. For instance, a developer for the organization may place a pointer to the code analyzer module 204 at an end of a build pipeline with respect to the source code 202. Thus, when a build is performed, the code analyzer module 204 is retrieved by the organization system 108 and executes over the source code 202. It is therefore noted that the computing system 100 itself does not obtain access to the source code 202 of the organization computing system 102.

In connection with generating the source code analysis data 122, the code analyzer module 204 can employ build files corresponding to the source code 202 to develop build dependencies. The code analyzer module 204, for each file, can construct an abstract syntax tree (AST) and can thereafter generate a control flow graph (CFG) based upon the AST. Based upon the CFG for a file, the code analyzer module 204 may generate a nested data structure that includes function definitions and function calls for the file. The code analyzer module 204 then traces arguments and targets of function calls with the CFG and traces formal returns of function definitions with the CFG. The code analyzer module 204 subsequently matches a path/module and name (and formal parameters in languages with overloading) of a function call with its definition. The code analyzer module 204 may then classify function calls as "pure" or "impure", where "pure" refers to a function call to an internal service and "impure" refers to a function call to a third party (e.g., a microservice provided by an external entity and/or one of the third-party systems 110-112), and the code analyzer module can trace impure function calls. The code analyzer module 204 detects data of predefined types and direction of data for impure calls by tracing arguments and targets of impure calls globally with a call graph; the data flow direction is classified from the function name and whether data of the predefined type was detected in arguments or targets. The source code analysis data 122 output by the source code analyzer module 204 can be a nested data structure containing, for each file in the source code 202, computer-executable modules that the file is a part of and each function call to a third-party computing system or computer-executable module including the third-party computing system or computer-executable module key, the type and direction of communication, and subtypes of predefined types of data (e.g., types of personal data exchanged).

While the source code analyzer module 204 has been described herein as performing a static analysis to construct the code analysis data 122, other approaches are contemplated. For example, dynamic analysis can be performed on the source code 202 in order to obtain the source code analysis data 122.

The organization system 108 further includes several computer-executable modules 206-208 that are based upon the source code 202. As described previously, the modules 206-208 are executed by the processor 104 of the organization computing system 102 at runtime. The organization system 108 further includes an infrastructure analyzer module 210 that monitors runtime operations of the organization computing system 102, including runtime operations of the modules 206-208, and outputs infrastructure data based upon the monitoring of the runtime operations. The infrastructure analyzer module 210 is provided to the organization computing system 102 by the infrastructure analyzer system 130. For instance, there are numerous computer-implemented services that are configured to monitor infrastructure of organizations to ensure that computing systems of the organizations are operating as desired by the organizations. Therefore, the infrastructure analyzer module 210 provides a runtime environmental view of the organization system 108. Information that may be included in the infrastructure data output by the infrastructure analyzer module includes logs, network connectivity, runtime data payload exchanges, connections between computer-executable modules, etc.

Figure 3:
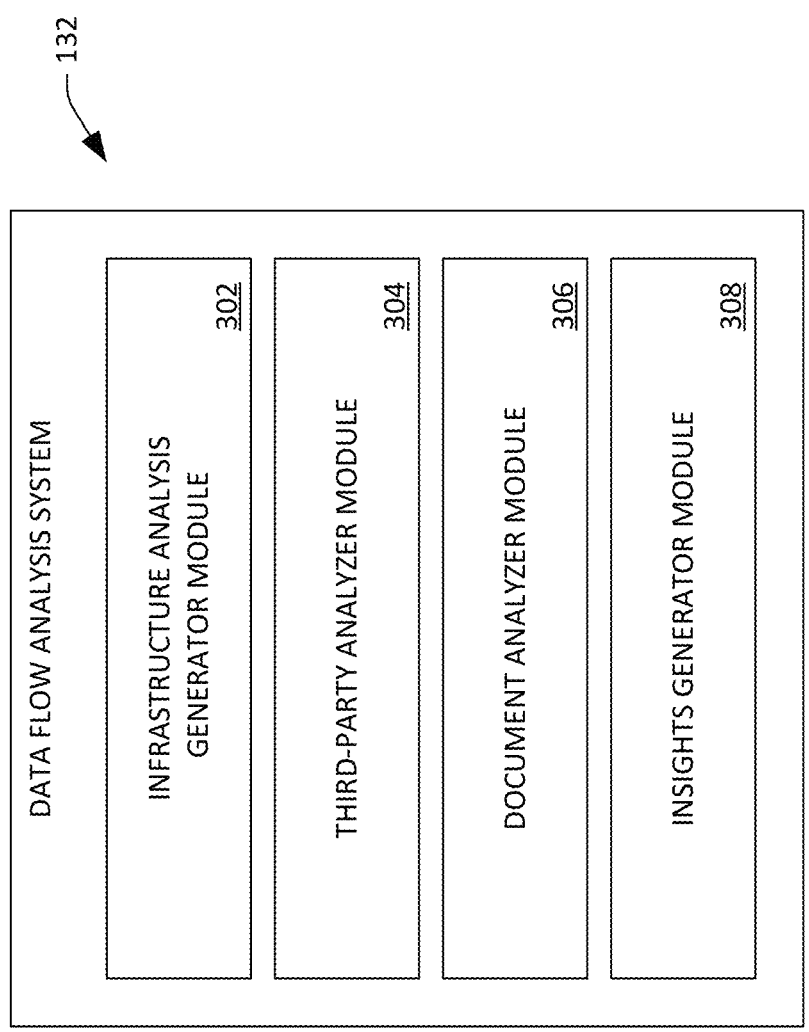
FIG. 3 is a functional block diagram of a data flow analysis system.

With reference now to FIG. 3, a functional block diagram of the data flow analysis system 132 is depicted. The data flow analysis system 132 includes an infrastructure analysis generator module 302 that receives the infrastructure data output by the infrastructure analyzer module 210. The module 302 is configured to output the infrastructure analysis data 124 based upon the infrastructure data received from the infrastructure analyzer module 210. With more particularity, the infrastructure analysis generator module 302 reviews information in the infrastructure data, such as logs, runtime data payload exchanges, network connectivity, connections between the modules 206-208, etc. Based upon such information, the module 302 builds a data structure that can be compared with the code analysis data 122, such that information in the data structure can be correlated with the code analysis data 122 to construct a data flow graph that represents flow of data of predefined types between computer-executable modules and/or third-party systems.

The dataflow analysis system 132 additionally comprises a third-party analyzer module 304 that is configured to construct the third-party analysis data 126. In an example, the third-party analyzer module 304 ascertains an identity of a third-party system that is in communication with the organization system 108 from the code analysis data 122 and/or the infrastructure analysis data 124. Upon ascertaining the identity of the third-party system, the third-party analyzer module 304 queries the third-party system (utilizing account information of the organization) for a payload that has a schema associated therewith that is exposed by the third-party system. The third-party analyzer module 304 may then extract field names from the schema that have non-null values; the third-party analyzer module 304 refrains from pulling data from the payload. Based upon the field names, the third-party analyzer module 304 ascertains (probabilistically) whether the field names identify data of a predefined type (e.g., personal data). For instance, the third-party analyzer module 304 can include one or more NLP models that can determine semantic similarity between a field name extracted from the schema and a known identifier of data of a predefined type. For instance, the extracted field name may be "electronic address" and a known identifier may be "email address". The third-party analyzer module 304 can tokenize the extracted field name and use embedding technologies to create an n-dimensional vector that represents semantics of the field name "electronic address". The third-party analyzer module 304 may then compute a similarity score between the n-dimensional vector and another n-dimensional vector that represents semantics of the identifier "email address", and can ascertain that the field name "electronic address" is semantically similar to the identifier "email address" based upon the similarity score. Hence, the third-party analysis data 126 output by the third-party analyzer module 304 can indicate that the third-party system receives "email addresses" from the organization system 108.

The data flow analysis system 132 also includes a document analyzer module 306 that generates the document analysis data 128. The document analyzer module 306 obtains a document from the documents repository 114, where the document may be any suitable type of document that includes information related to the organization system 108 with respect to data of a predefined type, wherein such information may include information pertaining to a constraint on the organization system 108 with respect to date of the predefined type. For instance, the document may be a Data Processing Agreement (DPA), a Master Services Agreement (MSA), security documentation, a Service Organization Controls (SOC) report, an internal policy or compliance document, a marketing document, etc. The document analyzer module 306 may include one or more machine learning models that are configured to identify different sections in computer-readable documents, assign topics to such sections, summarize contents of the sections, and extract information from the sections (prior to or subsequent to summarizing contents of the sections). In an example, information extracted from a section may include identities of types of data that is being processed by the organization system 108, a constraint on the organization system 108 with respect to one or more types of data, etc. Further, in an example, the document analyzer module 306 may be configured to identify regulations and/or statutes that may be applicable to information in the electronic document identified by the document analyzer module 306.

With more specificity, the document analyzer module 306 can partition the electronic document into sections of text, wherein the sections may include subsections that correspond to individual paragraphs/clauses. The document analyzer module 306, which may be or include a deep neural network (DNN), a recurrent neural network (RNN), a conditional random field (CRF), or other suitable machine learning structure, can classify the sections of text into one of several predefined classes, and can thereafter classify the subsections into subclasses. The document analyzer module 306 may then extract portions of the electronic document that are relevant to data processing operations being performed by the organization system 108. Examples include statutory constraints, identities of types of data subject to processing, records of processing activity that needed to be generated for certain types of data, etc.

The dataflow analysis system 132 also includes an insights generator module 308 that generates output based upon the data flow graph generated by the data flow analysis system 132 and the document analysis data 128 output by the document analyzer module 306. The insights generator module 308 can monitor the data flow graph for changes over time to identify new data types and data processing activities with respect to the data of the predefined type, and can generate an output to the analyst of the organization computing system 102 that highlights the changes. In addition, the insights generator module 308 can compare such changes to the document analysis data 128 output by the document analyzer module 306, and can surface conflicts between the changes in data processing and the electronic documents. The insights generator module 308 can also be configured to set forth remediation actions that allow the organization to proactively manage their data processing with respect to statutes, contractual obligations, regulations, etc. Still further, the insights generator module 308 can highlight gaps (where there should be an electronic document in place, but such document does not exist in the documents repository 114) or ambiguous language in the electronic documents in the documents repository 114. For instance, a clause in an electronic document may not satisfy a statutory provision; the insights generator module 308 can identify such clause and surface the clause to the analyst of the organization computing system 102, such that the analyst can address the deficiency in the electronic document. To accomplish the foregoing, the insights generator module 308 can perform multiple orders of analysis over the data flow graph (and information used to generate the data flow graph) and the document analysis data 128 to provide insights to the analyst.

Figure 4:
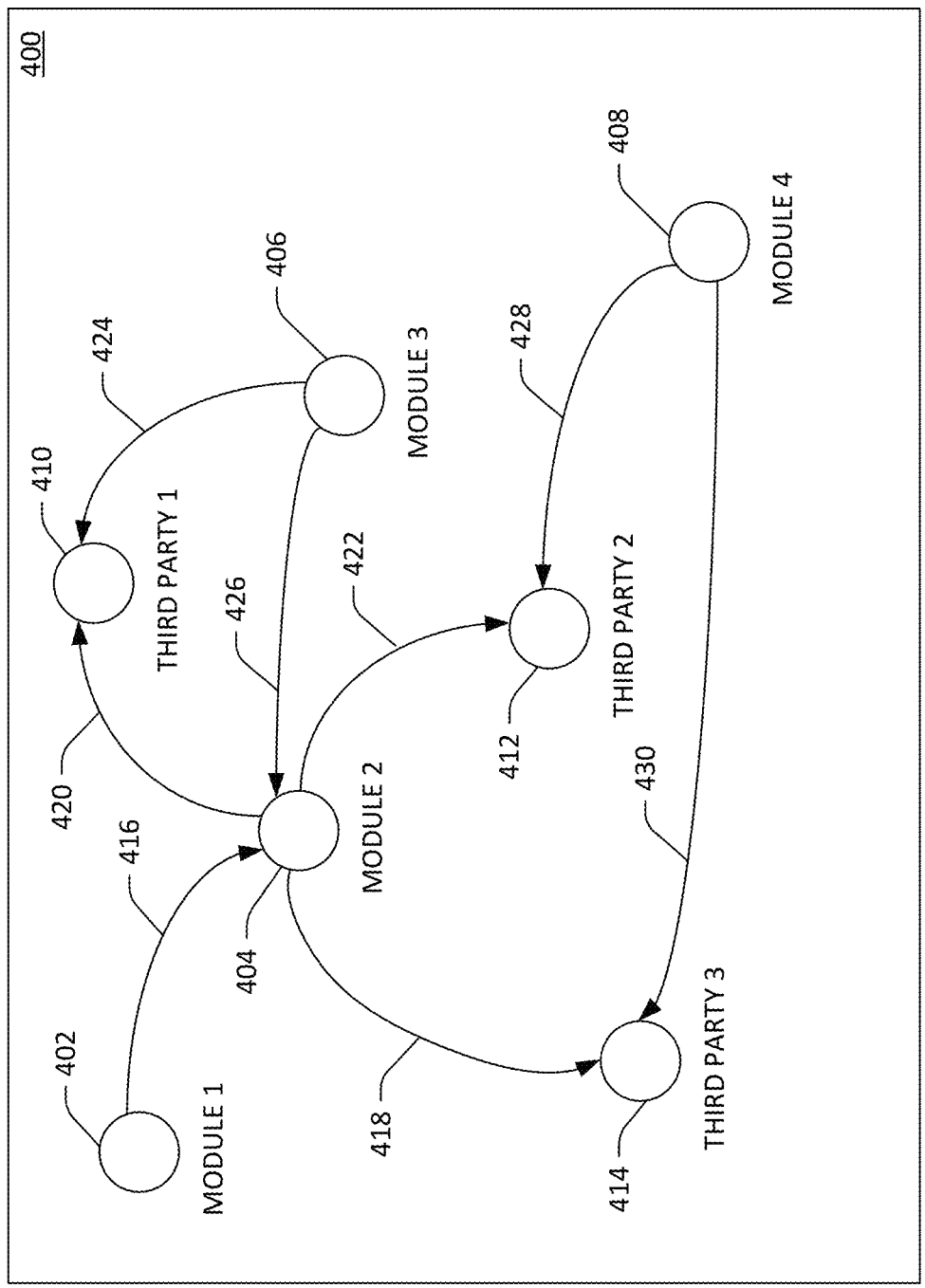
FIG. 4 is a graphical depiction of a data flow graph of an organization computing system that can be presented to an analyst of the organization computing system.

Referring now to FIG. 4, a graphical depiction of a data flow graph 400 that can be included in the data flow analysis output 134 is illustrated. The data flow graph 400 includes nodes 402-408 that respectively represent a first computer-executable module, a second computer-executable module, a third computer-executable module, and a fourth computer-executable module of the organization system 108. The data flow graph 400 also includes nodes 410-414 that respectively represent third-party systems that consume data output by one or more of the computer-executable modules represented by the nodes 402-408. The data flow graph 400 further includes directed edges 416-430 between nodes, where the directed edges 416-430 represent flow of data of the predefined type between computer-executable modules and/or third parties represented by the nodes. For instance, the data flow graph 400 includes a first edge 416 between the first node 402 and the second node 404, where the first edge 416 depicts that the first computer-executable module passes data to the second computer-executable module. Similarly, the data flow graph 400 includes a second edge 418 from the second node 404 to the seventh node 414, where the second edge 418 indicates that the second computer-executable module (represented by the second node 404) passes data to the third third-party system (represented by the seventh node 414).

While not illustrated, one or more third-party computing systems and/or computer-executable modules may be assigned to departments of the organization, and thus the nodes that represent such third-party systems and/or computer-executable modules can be assigned metadata that identifies the departments. For instance, the first third-party system is a computer-implemented system used by human resource departments of organizations. Therefore, the fifth node 410 that represents the first third-party system can be assigned the metadata tag "human resources"; the second and third nodes 404 and 406, respectively, can also be assigned the metadata tag "human resources", as computer-executable modules represented by the nodes 404 and 406 pass data of the predefined type to the first third-party system. When the analyst selects a tag "human resources," the nodes 404, 406, and 410 and the edges 420, 424, 426 can be highlighted, thereby indicating flow of data of the predefined type in the human resources department of the organization.

Figure 5:
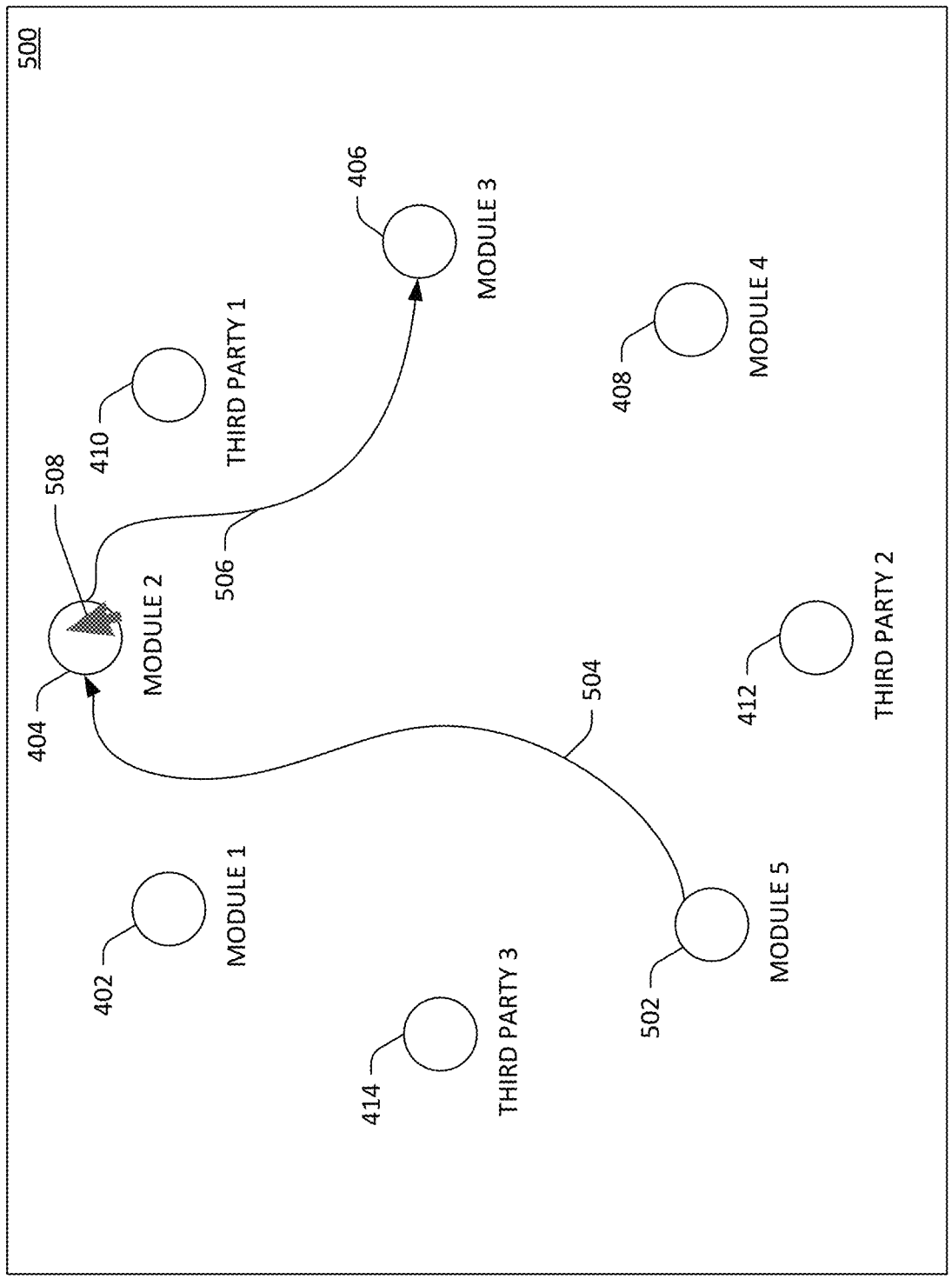
FIG. 5 illustrates an interactive diagram that can be presented to an analyst of an organization computing system.

With reference now to FIG. 5, an interactive diagram 500 that can be included in the data flow analysis output 134 is illustrated. The diagram 500 includes the nodes 402-408 that represent computer-executable modules, a node 502 that represents a fifth computer-executable modules, and the nodes 410-414 that represent the third-party systems. In this example, the diagram 500 fails to include edges between nodes that represent computer-executable modules and/or third-party systems that communicate with one another. Instead, edges 504 and 506 are presented in the diagram 500 when the second node 404 that represents the second computer-executable module is selected (e.g., by way of a cursor 508). The diagram 500 may be particularly advantageous when the organization system 108 includes a relatively large number of computer-executable modules. In the example illustrated in FIG. 5, the first edge 504 indicates that the fifth computer-executable module (represented by the node 502) passes data of the predefined type to the second computer-executable module (represented by the node 404). Similarly, the second edge 506 indicates that the second computer-executable module passes data of the predefined type to the third computer-executable module (represented by the node 406). While the illustrated diagram 500 includes nodes, it is to be understood that the nodes may be replaced by text. In addition, the edges can be assigned colors to indicate types of data passed between modules and/or systems. Moreover, while not illustrated, the diagram 500 may include dashed or grayed edges to illustrate data flows between computer-executable modules and/or third-party systems not selected in the diagram 500.

Now referring to FIG. 6, a record 600 that can be included in the data flow analysis output 134 is depicted. A data privacy/data protection document, policy, contract, regulation, statute, or other compliance related document may require that records be generated when personal data is processed. In the example shown in FIG. 6, the record 600 includes information such as the identity of a third-party system that processed the data, an indication as to whether the third-party system remains active, contact information that is processed, categories of people whose personal data have been processed by the identified third-party system, types of personal data that are processed by such system, and a rationale for processing the personal data. It is to be understood that the record 600 is set forth as an example, and the data flow analysis output 134 can include a record similar to the record 600 shown in FIG. 6 (but having a different structure). Moreover, the record 600 may include data that is based upon information extracted from the documents of the organization, where the information is relevant to data protection/data privacy.

In addition, the data flow analysis system 132 can output records of processing activity (ROPA) that have a format that is requested by an analyst of the organization computing system 102. Different jurisdictions have different data processing regulations, statutes, policies, etc., and the jurisdictions often require ROPAs that have different formats, relate to different types of data, etc. For instance, a first jurisdiction may require identification of types of security measures/security technologies that are employed when an organization computing system processes some types of personal data, while a second jurisdiction may not require such information when an organization computing system processes the same types of personal data. The data flow analysis system 132 can be configured to receive a selection of a jurisdiction or jurisdictions from the analyst of the organization computing system 102, and can further be configured to generate ROPAs that conform to the requirements of the selected jurisdiction(s) based upon the data flow graph.

Figure 7:
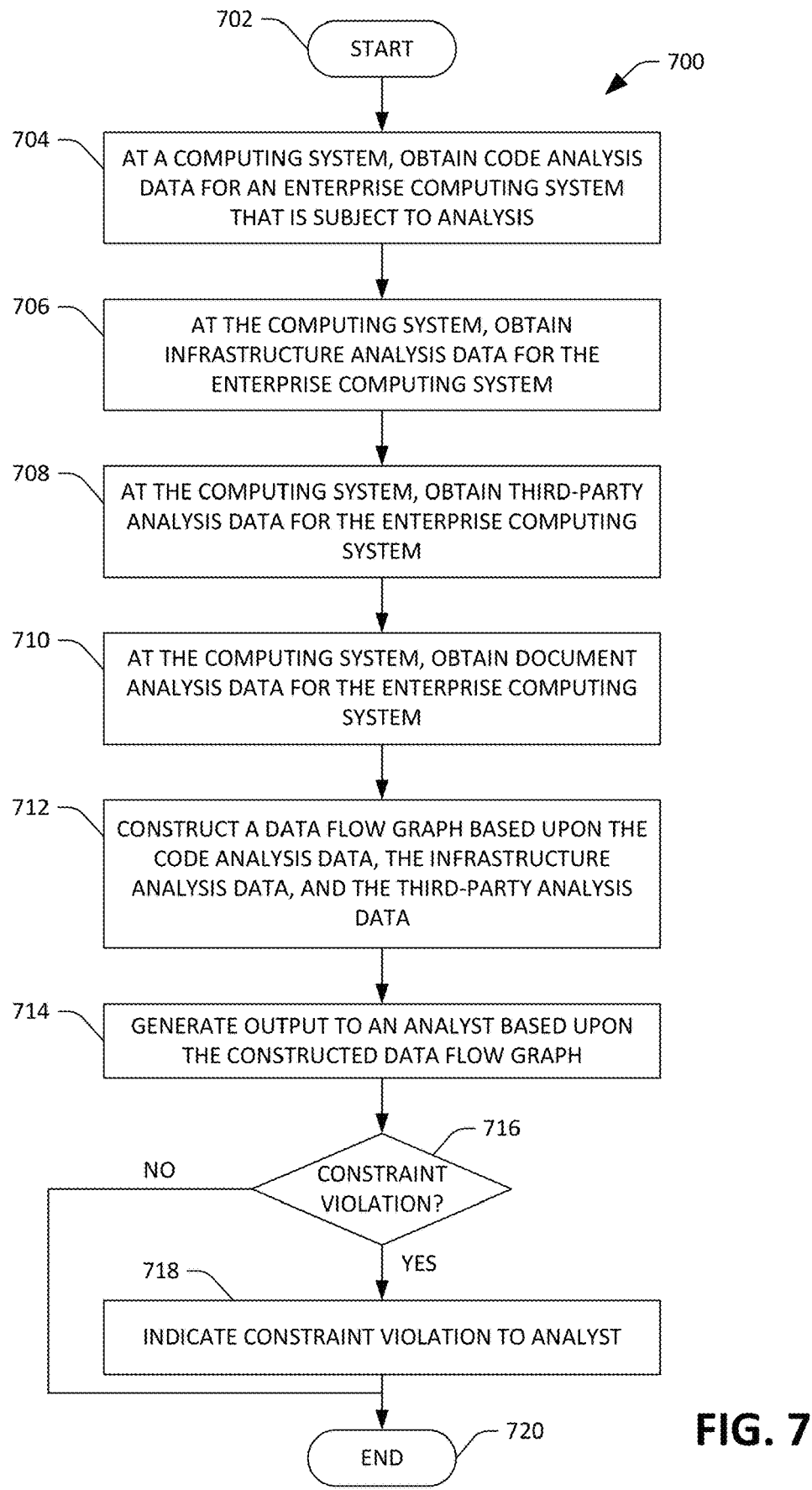
FIG. 7 is a flow diagram illustrating a methodology for generating an output to an analyst of an organization computing system based upon a data flow graph constructed for the organization computing system.

FIG. 7 illustrates a methodology relating to constructing a data flow graph that indicates flow of data of a predefined type between computer-executable modules of an organization computing system and/or third-party systems in communication with the third-party systems. While the methodology is shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a subroutine, programs, a thread of execution, and/or the like. Still further, results of acts of the methodologies can be stored in a computer-readable medium, displayed on a display device, and/or the like.

The methodology 700 starts at 702, and at 704, at a computing system (e.g., the computing system 100) code analysis data (e.g., code analysis data 122) for an organization computing system (e.g., the organization computing system 102) that is subject to analysis is obtained. At 706, at the computing system, infrastructure analysis data (e.g., the infrastructure analysis data 124) for the organization computing system is obtained.

At 708, and at the computing system, third-party analysis data (e.g., the third-party analysis data 126) for the organization computing system is obtained. At 710, and at the computing system, document analysis data (e.g., the document analysis data 128) for the organization computing system is obtained.

At 712, a data flow graph is constructed based upon the code analysis data, the infrastructure analysis data, the third-party analysis data, and optionally the document analysis data. As described previously, the data flow graph indicates flow of data of a predefined type between computer-executable modules and/or third-party systems. At 714, an output is generated to an analyst of the organization computing system based upon the constructed data flow graph. At 716, information is collected about data processing and a determination is made regarding whether processing of data of the predefined type violates a constraint specified in the document analysis data. When it is determined that there has been a constraint violation, the methodology 700 proceeds to 718, where the constraint violation is surfaced to the analyst of the organization computing system. When it is determined at 716 that there is no constraint violation, or subsequent to the constraint violation being surfaced to the analyst at 718, the methodology 700 completes at 720.

Figure 8:
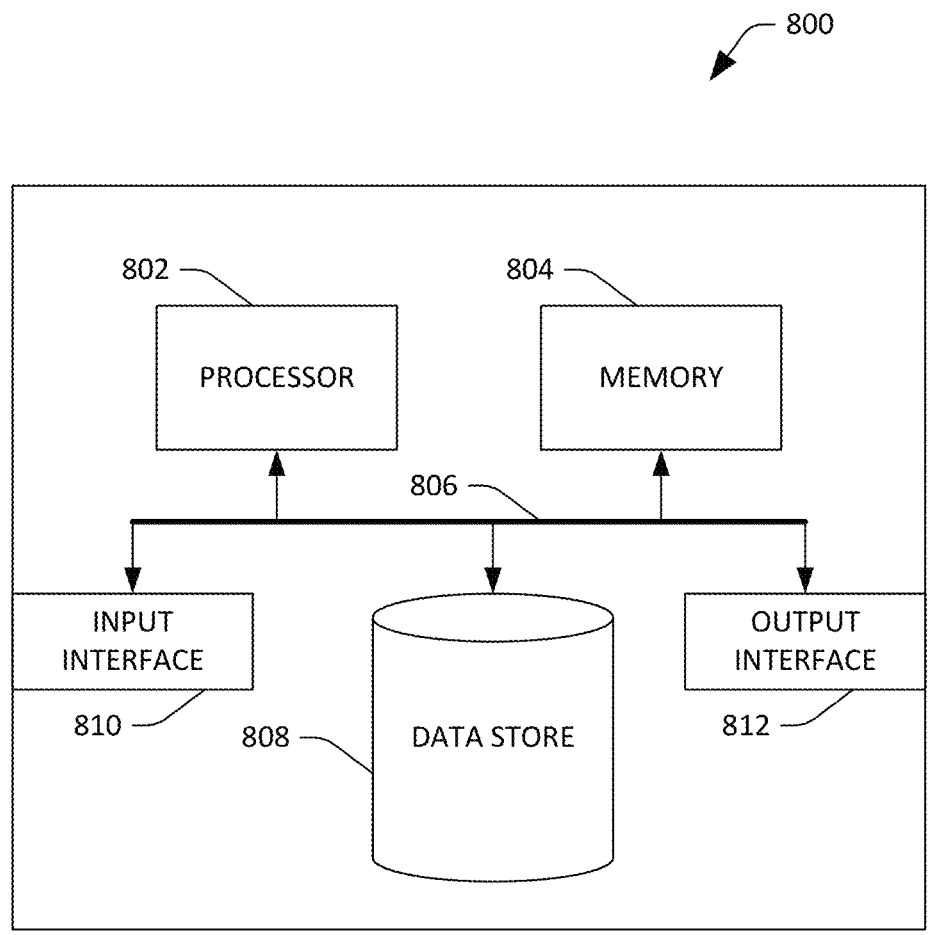
FIG. 8 is a functional block diagram of componentry of a computing system.

Referring now to FIG. 8, a high-level illustration of a computing device 800 that can be used in accordance with the systems and methodologies disclosed herein is illustrated. For instance, the computing device 800 may be used in a system that supports constructing data flow graphs. By way of another example, the computing device 800 can be used in a system that is configured to identify constraint violations. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store code analysis data, infrastructure analysis data, third-party analysis data, and document analysis data.

The computing device 800 additionally includes a data store 808 that is accessible by the processor 802 by way of the system bus 806. The data store 808 may include executable instructions, computer-readable documents, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The features described herein relate to generating and analyzing data flows in an organization computing system, according to at least the examples provided below.

(A1) In one aspect, some embodiments include a method performed by a computing system. The method comprises obtaining code analysis data for an organization computing system that is subject to analysis, wherein the code analysis data indicates that code of the organization computing system includes a first function that outputs data of a predefined type to a second function, wherein the first function is included in a first file that corresponds to a first computer-executable module and the second function is included in a second file that corresponds to a second computer-executable module. The method also comprises obtaining infrastructure analysis data for the organization computing system, wherein the infrastructure analysis data identifies computer-executable modules of the organization computing system, and further wherein the infrastructure analysis data indicates that when the first computer-executable module in the computer-executable modules is executed by the organization computing system, the first computer-executable module passes data to the second computer-executable module. The method further comprises based upon the code analysis data and the infrastructure analysis data, determining that, when the first computer-executable module and the second computer-executable module are executed, the first computer-executable module passes the data of the predefined type to the second computer-executable module. The method additionally comprises upon determining that the first computer-executable module passes the data of the predefined type to the second computer-executable module, generating an output to an analyst of the organization computing system that the first computer-executable module passes the data of the predefined type to the second computer-executable module.

(A2) In some embodiments of the method of A1, the data of the predefined type is personal data.

(A3) In some embodiments of the method of any of A1-A2, the output comprises a graph for display on a computing device of the analyst, wherein the graph comprises: a first node that is representative of the first computer-executable module; a second node that is representative of the second computer-executable module; and a directed edge from the first node to the second node, the directed edge indicates that the data of the predefined type is passed from the first computer-executable module to the second computer-executable module.

(A4) In some embodiments of any of the methods of A1-A3, the output comprises a computer-readable record, the computer-readable record comprises: an identifier for the data of the predefined type; and an identity of the first computer-executable module that passes the data of the predefined type to the second computer-executable module.

(A5) In some embodiments of any of the methods of A1-A4, the method further comprises obtaining third-party analysis data, wherein the third-party analysis data indicates that a third-party computing system receives data from the organization computing system; and based upon the third-party analysis data, the code analysis data, and the infrastructure analysis data, determining that the third-party computing system receives the data of the predefined type from the organization computing system, wherein the output indicates to the analyst of the organization computing system that the third-party computing system receives the data of the predefined type from the organization computing system.

(A6) In some embodiments of any of the methods of A1-A5, the method further comprises: obtaining document analysis data, the document analysis data identifies a constraint specified in a computer-readable document of an organization that operates the organization computing system, the constraint pertaining to the data of the predefined type; and based upon the document analysis data, the code analysis data, and the infrastructure analysis data, determining that the organization violates the constraint specified in the computer-readable document, wherein the output indicates to the analyst of the organization computing system that the organization violates the constraint.

(A7) In some embodiments of the method of A6, obtaining the document analysis data comprises: retrieving the computer-readable document from computer-readable storage; utilizing natural language processing technologies, identifying a section of the document that comprises the constraint; and utilizing a trained machine learning model, identifying the constraint in the section of the document that comprises the constraint.

(A8) In some embodiments of the method of A7, the method further comprises: utilizing a second trained machine learning model, identifying an ambiguous term in the document; and generating second output, wherein the second output is configured to inform the analyst of the organization computing system that the document includes the ambiguous term.

(A9) In some embodiments of any of the methods of A1-A8, the method further comprises obtaining document analysis data, the document analysis data includes data that specifies a format for a record of processing activity that is to be generated when data of the predefined type is processed by the organization system; and generating the record of processing activity based upon the document analysis data and the output.

(A10) In some embodiments of any of the methods of A1-A9, the code analysis data comprises names of functions in the code and parameters passed by the functions in the code.

(A11) In some embodiments of any of the methods of A1-A10, the output comprises a graph that includes a first node that represents the first computer-executable module and a second node that represents the second computer-executable module, and further wherein the graph is updated to depict an edge between the first node and the second node upon receipt of a selection of either the first node or the second node, the edge indicates that the first computer-executable module passes the data of the predefined type to the second computer-executable module.

(B1) In another aspect, some embodiments include a method performed by a computing system. The method comprises obtaining code analysis data for code of an organization computing system, wherein the code analysis data is based upon output of a static analysis performed on the code at the organization computing system, and further wherein the code analysis data indicates that code of the organization computing system includes a first function that passes data of a predefined type to a second function, wherein the first function is assigned to a first computer-executable module of the organization computing system and the second function is assigned to a second computer-executable module of the organization computing system. The method further comprises obtaining infrastructure analysis data for the organization computing system, wherein the infrastructure analysis data identifies that the first computer-executable module passes data to the second computer-executable module. The method also comprises constructing a data flow graph based upon the code analysis data and the infrastructure analysis data, wherein the data flow graph indicates that the data of the predefined type flows from the first computer-executable module to the second computer-executable module. The method additionally comprises outputting computer-readable information to an analyst of the organization computing system based upon the data flow graph, the computer-readable information indicates to the analyst that the data of the predefined type flows from the first computer-executable module to the second computer-executable module.

(B2) In some embodiments of the method of B1, the data of the predefined type is personal data, and the method further comprises determining that a data privacy requirement, agreement, policy, statute, and/or regulation has been violated based upon the data flow graph, wherein the information further indicates to the analyst that the data privacy regulation has been violated.

(B3) In some embodiments of any of the methods of B1-B2, the method further comprises: obtaining third-party analysis data, wherein the third-party analysis data indicates that a third-party computing system receives data from the organization computing system; and based upon the third-party analysis data, the code analysis data, and the infrastructure analysis data, determining that the third-party computing system receives the data of the predefined type from the organization computing system, wherein the output indicates to the analyst of the organization computing system that the third-party computing system receives the data of the predefined type from the organization computing system.

(B4) In some embodiments of the method of B3, obtaining the third-party analysis data comprises querying the third-party computing system to retrieve a schema exposed by the third-party computing system, wherein the third-party computing system is determined to receive the data of the predefined type based upon the schema.

(B5) In some embodiments of any of the methods of B1-B4, the computer-readable information comprises a graph for display on a computing device of the analyst, wherein the graph comprises: a first node that is representative of the first computer-executable module; a second node that is representative of the second computer-executable module; and a directed edge from the first computer-executable module to the second computer-executable module, the directed edge indicates that the data of the predefined type is passed from the first computer-executable module to the second computer-executable module.

(B6) In some embodiments of any of the methods of B1-B5, the code analysis data comprises names of functions in the code and parameters passed by the functions in the code, and further wherein the data flow graph is constructed based upon the names of the functions in the code and the parameters passed by the functions in the code.

(B7) In some embodiments of any of the methods of B1-B6, the method further comprises obtaining document analysis data, the document analysis data identifies a constraint specified in a document of an organization that operates the organization computing system, the constraint pertaining to the data of the predefined type; and based upon the document analysis data, the code analysis data, and the infrastructure analysis data, determining that the organization violates the constraint specified in the document, wherein the computer-readable information indicates to the analyst of the organization computing system that the organization violates the constraint.

(B8) In some embodiments of the method of B7, obtaining the document analysis data comprises: retrieving a document from computer-readable storage where documents of the organization are stored; and utilizing natural language processing technologies, identifying the constraint in the document, wherein the organization is determined to violate the constraint based upon the identified constraint and the data flow graph.

(C1) In another aspect, some embodiments include a method performed by a computing system. The method includes constructing a data flow graph for a computing system of an organization, wherein the data flow graph indicates that data of a predefined type is output by a first computer-executable module of the computing system of the organization, wherein the data flow graph further indicates that the data of the predefined type is input to a second computer-executable module of the organization, and further wherein the data flow graph for the computing system of the organization is constructed based upon: infrastructure analysis data for the computing system, wherein the infrastructure analysis data identifies that the first computer-executable module and the second computer-executable module are utilized by the computing system; and code analysis data for the computing system, wherein the code analysis data indicates that the first computer-executable module passes the data of the predefined type to the second computer-executable module. The method also includes causing a graphical user interface (GUI) to be presented to an analyst of the computing system, the GUI comprises graphical data that indicates that the data of the predefined type is output by the first computer-executable module and further indicates that the data of the predefined type is input to the second computer-executable module.

(D1) In another aspect, some embodiments include a computing system (e.g., 100) that includes a processor (e.g., 118) and memory (e.g., 120), where the memory includes instructions that, when executed by the processor, cause the processor to perform any of the methods described herein (e.g., any of A1-A11, B1-B8, and/or C1).

(E1) In yet another aspect, some embodiments include a computer-readable storage medium that includes instructions that, when executed by a processor of a computing system (e.g., 100), cause the processor to perform any of the methods described herein (e.g., any of A1-A11, B1-B8, and/or C1).

As used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
   a processor; and
   memory storing instructions that, when executed by the processor, cause the processor to perform acts comprising:
   obtaining code analysis data for an organization computing system that is subject to analysis, wherein the code analysis data indicates that code of the organization computing system includes a first function that outputs data of a predefined type to a second function, wherein the first function is included in a first file that corresponds to a first computer-executable module and the second function is included in a second file that corresponds to a second computer-executable module;
   obtaining infrastructure analysis data for the organization computing system, wherein the infrastructure analysis data identifies computer-executable modules of the organization computing system, and further wherein the infrastructure analysis data indicates that when the first computer-executable module in the computer-executable modules is executed by the organization computing system, the first computer-executable module passes data to the second computer-executable module;
   based upon the code analysis data and the infrastructure analysis data, determining that, when the first computer-executable module and the second computer-executable module are executed, the first computer-executable module passes the data of the predefined type to the second computer-executable module; and
   upon determining that the first computer-executable module passes the data of the predefined type to the second computer-executable module, generating an output to an analyst of the organization computing system that the first computer-executable module passes the data of the predefined type to the second computer-executable module, wherein the output is based upon a data flow graph that includes a first node that represents the first computer-executable module, a second node that represents the second computer-executable module, and a directed edge from the first node to the second node that indicates the data of the predefined type is passed from the first computer-executable module to the second computer-executable module.

2. The computing system of claim 1, wherein the data of the predefined type is personal data.

3. The computing system of claim 1, wherein the data flow graph is displayed on a computing device of the analyst of the organization computing system.

4. The computing system of claim 1, wherein the output comprises a computer-readable record, the computer-readable record comprises:
   an identifier for the data of the predefined type; and
   an identity of the first computer-executable module that passes the data of the predefined type to the second computer-executable module.

5. The computing system of claim 1, the acts further comprising:
   obtaining third-party analysis data, wherein the third-party analysis data indicates that a third-party computing system receives data from the organization computing system; and
   based upon the third-party analysis data, the code analysis data, and the infrastructure analysis data, determining that the third-party computing system receives the data of the predefined type from the organization computing system, wherein the output indicates to the analyst of the organization computing system that the third-party computing system receives the data of the predefined type from the organization computing system.

6. The computing system of claim 1, the acts further comprising:
   obtaining document analysis data, the document analysis data identifies a constraint specified in a computer-readable document of an organization that operates the organization computing system, the constraint pertaining to the data of the predefined type; and
   based upon the document analysis data, the code analysis data, and the infrastructure analysis data, determining that the organization violates the constraint specified in the computer-readable document, wherein the output indicates to the analyst of the organization computing system that the organization violates the constraint.

7. The computing system of claim 6, wherein obtaining the document analysis data comprises:
   retrieving the computer-readable document from a computer-readable storage;
   utilizing natural language processing technologies, identifying a section of the computer-readable document that comprises the constraint; and
   utilizing a trained machine learning model, identifying the constraint in the section of the computer-readable document that comprises the constraint.

8. The computing system of claim 7, the acts further comprising:
   utilizing a second trained machine learning model, identifying an ambiguous term in the computer-readable document; and
   generating second output, wherein the second output is configured to inform the analyst of the organization computing system that the computer-readable document includes the ambiguous term.

9. The computing system of claim 1, the acts further comprising:
   obtaining document analysis data, the document analysis data includes data that specifies a format for a record of processing activity that is to be generated when data of the predefined type is processed by the organization computing system; and
   generating the record of processing activity based upon the document analysis data and the output.

10. The computing system of claim 1, wherein the code analysis data comprises names of functions in the code and parameters passed by the functions in the code.

11. The computing system of claim 1, wherein the data flow graph is displayed on a computing device of the analyst of the organization computing system, and further wherein the data flow graph is updated to depict the edge between the first node and the second node upon receipt of a selection of either the first node or the second node.

12. A method performed by a computing system, the method comprising:
   obtaining code analysis data for code of an organization computing system, wherein the code analysis data is based upon output of a static analysis performed on the code of the organization computing system, and further wherein the code analysis data indicates that the code of the organization computing system includes a first function that passes data of a predefined type to a second function, wherein the first function is assigned to a first computer-executable module of the organization computing system and the second function is assigned to a second computer-executable module of the organization computing system;
obtaining infrastructure analysis data for the organization computing system, wherein the infrastructure analysis data identifies that the first computer-executable module passes data to the second computer-executable module;
constructing a data flow graph based upon the code analysis data and the infrastructure analysis data, wherein the data flow graph comprises a first node that is representative of the first computer-executable module, a second node that is representative of the second computer-executable module, and a directed edge from the first node to the second node, the directed edge indicates that the data of the predefined type is passed from the first computer-executable module to the second computer-executable module; and
outputting computer-readable information to an analyst of the organization computing system based upon the data flow graph, the computer-readable information indicates to the analyst of the organization computing system that the data of the predefined type flows from the first computer-executable module to the second computer-executable module.

13. The method of claim 12, wherein the data of the predefined type is personal data, the method further comprising:
determining that a data privacy requirement, agreement, policy, statute, and/or regulation has been violated based upon the data flow graph, wherein the computer-readable information further indicates to the analyst of the organization computing system that the data privacy regulation has been violated.

14. The method of claim 12, further comprising:
obtaining third-party analysis data, wherein the third-party analysis data indicates that a third-party computing system receives data from the organization computing system; and
based upon the third-party analysis data, the code analysis data, and the infrastructure analysis data, determining that the third-party computing system receives the data of the predefined type from the organization computing system, wherein the output indicates to the analyst of the organization computing system that the third-party computing system receives the data of the predefined type from the organization computing system.

15. The method of claim 14, wherein obtaining the third-party analysis data comprises querying the third-party computing system to retrieve a schema exposed by the third-party computing system, wherein the third-party computing system is determined to receive the data of the predefined type based upon the schema.

16. The method of claim 12, wherein the data flow graph is displayed on a computing device of the analyst of the organization computing system.

17. The method of claim 12, wherein the code analysis data comprises names of functions in the code and parameters passed by the functions in the code, and further wherein the data flow graph is constructed based upon the names of the functions in the code and the parameters passed by the functions in the code.

18. The method of claim 12, further comprising:
obtaining document analysis data, the document analysis data identifies a constraint specified in a document of an organization that operates the organization computing system, the constraint pertaining to the data of the predefined type; and
based upon the document analysis data, the code analysis data, and the infrastructure analysis data, determining that the organization violates the constraint specified in the document of the organization, wherein the computer-readable information indicates to the analyst of the organization computing system that the organization violates the constraint.

19. The method of claim 18, wherein obtaining the document analysis data comprises:
retrieving the document of the organization from computer-readable storage where documents of the organization are stored; and
utilizing natural language processing technologies, identifying the constraint in the document of the organization, wherein the organization is determined to violate the constraint based upon the identified constraint and the data flow graph.

20. A computer-readable storage medium comprising instructions that, when executed by a processor, cause the processor to perform acts comprising:
constructing a data flow graph for a computing system of an organization, wherein the data flow graph comprises a first node that is representative of a first computer-executable module of the computing system of the organization, a second node that is representative of a second computer-executable module of the computing system of the organization, and a directed edge from the first node to the second node, wherein the directed edge indicates that data of a predefined type is output by the first computer-executable module, the directed edge further indicates that the data of the predefined type is input to the second computer-executable module, and wherein the data flow graph for the computing system of the organization is constructed based upon:
infrastructure analysis data for the computing system, wherein the infrastructure analysis data identifies that the first computer-executable module and the second computer-executable module are utilized by the computing system; and
code analysis data for the computing system of the organization, wherein the code analysis data indicates that the first computer-executable module passes the data of the predefined type to the second computer-executable module; and
causing a graphical user interface (GUI) to be presented to an analyst of the computing system of the organization, the GUI comprises graphical data that indicates that the data of the predefined type is output by the first computer-executable module and further indicates that the data of the predefined type is input to the second computer-executable module.

* * * * *